(12) United States Patent
Doornebosch

(10) Patent No.: US 10,302,475 B2
(45) Date of Patent: May 28, 2019

(54) THERMAL FLOW METER HAVING A COVER ELEMENT THAT SURROUNDS AN INSULATED HOUSING

(71) Applicant: BERKIN B.V., Ruurlo (NL)

(72) Inventor: Tristan Doornebosch, Enschede (NL)

(73) Assignee: BERKIN B.V., Ruurlo (NL)

( * ) Notice: Subject to any disclaimer, the term of this patent is extended or adjusted under 35 U.S.C. 154(b) by 70 days.

(21) Appl. No.: 15/104,493

(22) PCT Filed: Dec. 15, 2014

(86) PCT No.: PCT/NL2014/050860
§ 371 (c)(1),
(2) Date: Jun. 14, 2016

(87) PCT Pub. No.: WO2015/093941
PCT Pub. Date: Jun. 25, 2016

(65) Prior Publication Data
US 2017/0023388 A1    Jan. 26, 2017

(30) Foreign Application Priority Data

Dec. 17, 2013    (NL) ...................................... 2011975

(51) Int. Cl.
*G01F 1/684* (2006.01)
*G01F 15/14* (2006.01)
*G01F 15/18* (2006.01)

(52) U.S. Cl.
CPC ............ *G01F 1/6847* (2013.01); *G01F 15/14* (2013.01); *G01F 15/185* (2013.01)

(58) Field of Classification Search
CPC .............................. G01F 1/6847; G01F 15/14
See application file for complete search history.

(56) References Cited

U.S. PATENT DOCUMENTS 3,187,569 A * 6/1965 Los ....................... G01F 1/6847
                                                                                 73/196
3,938,384 A    2/1976 Blair
(Continued)

FOREIGN PATENT DOCUMENTS

EP        0809090     11/1997
EP        1867962     12/2007
(Continued)

*Primary Examiner* — Harshad R Patel
*Assistant Examiner* — Tran M. Tran
(74) *Attorney, Agent, or Firm* — Casimir Jones S.C.; Tyler J. Sisk

(57) ABSTRACT

The invention relates to a thermal type flow meter. The flow meter comprises a base part with at least two through bores extending substantially parallel to each other. A flow tube for the medium whose flow is to be determined is provided through the through bores. A part of the flow tube spaced from the base part comprises a measuring tube part where the flow of the medium can be measured. The flow measuring tube comprises an insulating housing connected to the base part, which surrounds at least the measuring tube part of the flow tube. The insulating housing comprises an inner housing surface, which faces the measuring tube part, as well as an outer housing surface, which faces away from the measuring tube part. According to the invention, a cover element connected to the base part is provided, which cover element at least substantially surrounds the insulating housing.

6 Claims, 3 Drawing Sheets

(56) References Cited

U.S. PATENT DOCUMENTS

| | | | | |
|---|---|---|---|---|
| 4,487,062 A * | 12/1984 | Olin | G01F 5/00 | 73/202.5 |
| 4,517,838 A | 5/1985 | Wachi et al. | | |
| 4,519,246 A * | 5/1985 | Hartemink | G01F 1/6847 | 73/202.5 |
| 4,548,075 A * | 10/1985 | Mariano | G01F 5/00 | 73/202.5 |
| 4,648,270 A * | 3/1987 | Johnson | G01F 5/00 | 73/202.5 |
| 4,738,143 A * | 4/1988 | Cage | G01F 1/8409 | 73/861.355 |
| 5,191,793 A * | 3/1993 | Drexel | G01F 1/6847 | 73/204.22 |
| 5,205,170 A * | 4/1993 | Blechinger | G01F 1/6845 | 374/E13.001 |
| 5,309,762 A | 5/1994 | Satoh et al. | | |
| 5,660,207 A * | 8/1997 | Mudd | B23P 11/005 | 137/44 |
| 5,763,774 A * | 6/1998 | Ha | G01F 1/6842 | 73/202 |
| 5,901,741 A * | 5/1999 | Mudd | B23P 11/005 | 137/486 |
| 6,062,077 A * | 5/2000 | Azima | G05D 7/0635 | 73/204.27 |
| 6,125,695 A * | 10/2000 | Alvesteffer | G01F 1/6847 | 73/204.27 |
| 6,637,264 B2 * | 10/2003 | Lotters | G01F 1/6847 | 73/204.27 |
| 7,021,136 B2 * | 4/2006 | Vincze | G01F 1/6845 | 73/204.26 |
| 7,216,534 B2 * | 5/2007 | Masuichi | G01F 1/6847 | 73/202.5 |
| 7,437,928 B2 * | 10/2008 | Bos | G01F 1/6847 | 73/204.22 |
| 7,469,583 B2 * | 12/2008 | Suzuki | G01F 1/6847 | 73/204.25 |
| 7,600,422 B2 * | 10/2009 | Hasebe | G01F 1/684 | 73/204.17 |
| 7,748,268 B2 * | 7/2010 | Lull | G01F 15/005 | 73/204.22 |
| 7,971,480 B2 * | 7/2011 | Smirnov | G01F 1/6847 | 73/202.5 |
| 8,015,870 B2 * | 9/2011 | Inoue | G01F 1/6888 | 73/204.11 |
| 8,151,652 B2 * | 4/2012 | Geest | G01F 1/8413 | 73/861.355 |
| 8,251,091 B2 * | 8/2012 | Zolock | G01F 1/6847 | 137/485 |
| 8,528,419 B2 * | 9/2013 | Hussain | G01F 1/8477 | 73/861.355 |
| 8,850,872 B2 * | 10/2014 | Jarvie | G01M 3/2892 | 137/409 |
| 9,217,664 B2 * | 12/2015 | Lanham | G01F 1/8409 | |
| 9,970,801 B2 * | 5/2018 | Ishii | G01F 1/684 | |
| 2004/0134271 A1 * | 7/2004 | Gralenski | G01F 1/6842 | 73/202.5 |
| 2008/0196494 A1 | 8/2008 | Suzuki | | |
| 2010/0089459 A1 | 4/2010 | Smirnov et al. | | |

FOREIGN PATENT DOCUMENTS

| | | |
|---|---|---|
| JP | S56-73317 | 6/1981 |
| JP | S59-105520 | 6/1984 |
| WO | 03/058180 | 7/2003 |
| WO | 2012-057886 | 5/2012 |

* cited by examiner

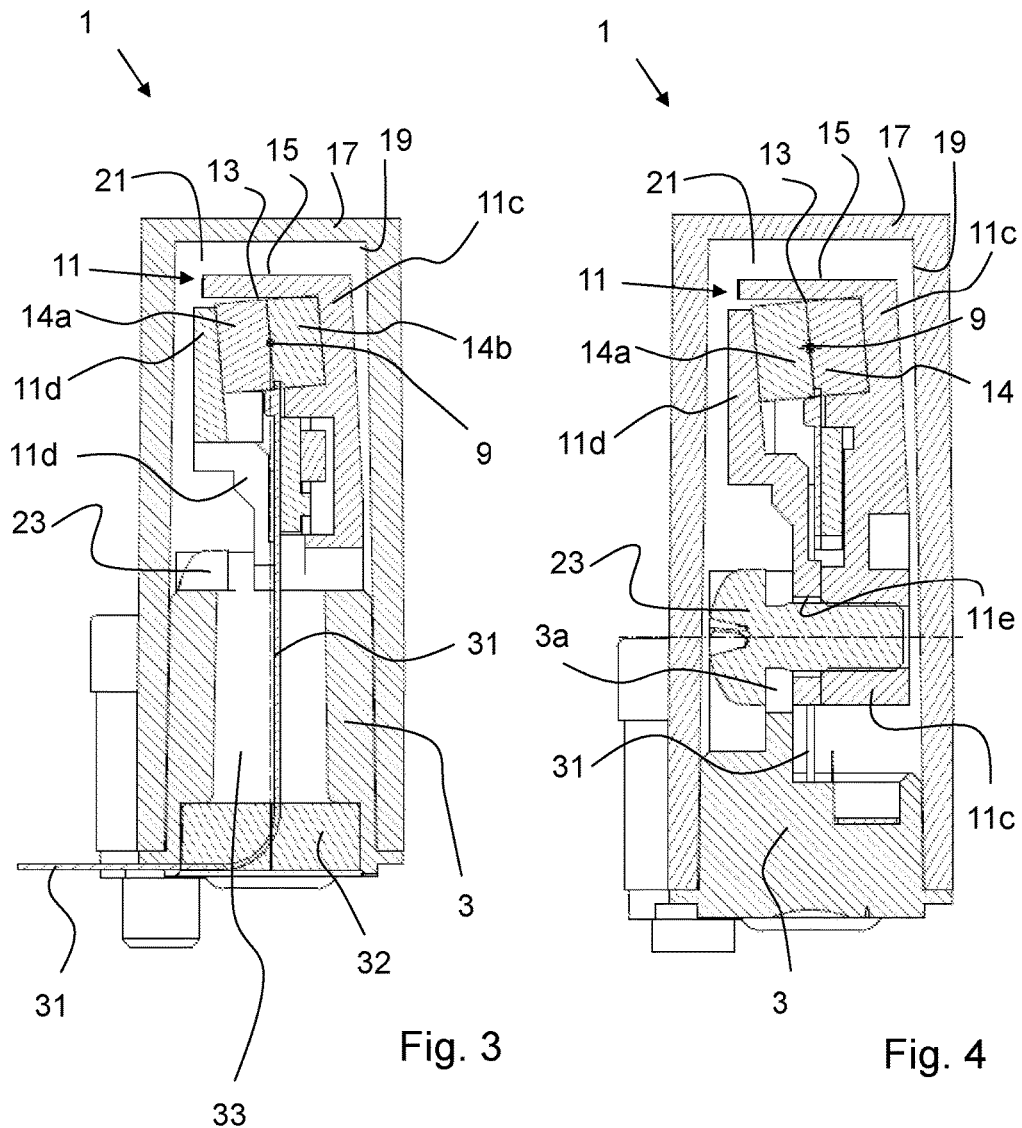

THERMAL FLOW METER HAVING A COVER ELEMENT THAT SURROUNDS AN INSULATED HOUSING

The invention relates to a thermal type flow meter, comprising a base part provided with at least two through bores extending substantially parallel to each other, a flow tube for the medium whose flow is to be determined, which flow tube extends through the at least two through bores, wherein a part spaced from the base part comprises a measuring tube part where the flow of the medium can be measured.

A flow meter of the above kind is known, for example from EP 1 867 962. In general, thermal flow sensors are furthermore known from JP S56 73317 A and WO 2012/057886. Thermal flow meters comprising flow sensors with a capillary tube make use of the fact that heat transfer from the tube wall to a fluid (gas or liquid) that flows in the tube is a function of the mass flow rate, the difference between the fluid temperature and the wall temperature and the specific heat capacity of the fluid. In mass flow controllers a large variety of flow sensor configurations is used. A specific type of construction for example includes the use of a stainless steel flow tube with two or more resistance elements which are in thermally conductive contact with the flow tube. The resistance elements are typically made of a material having a high resistance temperature coefficient. Each of the elements can function as a heater, as a temperature detector, or as both. At least one resistance element (the heater) is energised with electrical current for supplying heat to the fluid flow through the tube. When two heaters with a constant power are energised, the mass flow rate of the fluid through the tube can be derived from the temperature differences between the resistance elements. In another method, a first resistance element at a first position functions as a heater and as a temperature detector, and a second resistance element disposed at a second position, upstream of the first position, functions as a temperature detector. A control circuit functions to maintain the temperature difference between the resistance elements during flow at a constant, predetermined value, wherein the mass flow rate of the fluid flowing through the tube is determined from data from the control circuit. This measuring method is called the Constant Temperature (CT) method. The present invention is also suitable for use with the TB (Thermal Balancing) method as described in EP 1 477 779, for example.

A problem that occurs with the above measuring methods and systems is that inaccuracies in the measuring signal can occur when the through-flow through the tube is relatively low. The inventors attribute this to the fact that thermal mass flow sensors are often used in environments where temperature gradients across (parts of the) flow tube and/or across the resistance elements can develop.

NL 1032207 describes a flow sensor wherein the flow tube is thermally clamped locally between two insulating housing parts made of a material that conducts heat well, wherein the insulating housing surrounds the connecting leg with the two electrical resistance elements, the bends and the legs of the flow tube. Although the solution described in NL 1032007 functions adequately, there may be thermal asymmetry across the insulating housing part in this solution.

Accordingly it is the object of the invention to provide a flow meter of the type described in the introduction which counteracts the influence of temperature gradients from outside so as to prevent or minimise the development of a temperature gradient in use, not only across the operational segment of the flow tube, i.e. across the part that lies between the sides of the resistance elements that face away from each other, but also across the legs (and across the bends that connect the legs to the connecting leg).

The flow meter according to the present invention comprises an insulating housing which substantially surrounds at least the measuring tube part of the flow tube, and preferably substantially the entire flow tube. The insulating housing comprises a receiving space for at least part of the flow tube. The insulating housing comprises an inner housing surface which bounds the receiving space and thus faces the flow measuring tube. In particular, part of the inner housing surface may be in contact with the flow tube. The insulating housing comprises an outer housing surface which faces away from the flow measuring tube and which forms the outer side of the insulating housing.

A flow meter according to the present invention is characterised in that the flow meter comprises a cover element connected to the base part, which cover element at least substantially surrounds the insulating housing. The cover element comprises an inner cover surface which faces the outer housing surface and which is preferably spaced therefrom by a distance such that an insulating layer is formed between the inner cover surface and the outer housing surface. By placing such a cover element over the insulating housing and connecting it to the base part, a relatively thin insulating layer is formed between the insulating housing and the cover element. By having the mechanical and thermal coupling take place via the base part, gradients across the flow tube and/or the insulating housing are minimised. As a result, the influence of temperature differences outside the flow meter and temperature gradients across the flow tube resulting therefrom is further reduced. The object of the present invention is thus achieved.

Advantageous embodiments form the subject matter of the dependent claims. A few of these embodiments will be explained in more detail hereinafter.

In one embodiment of the flow meter, the spacing between the inner cover surface and the outer housing surface is substantially constant. The thickness of the insulating layer between the insulating housing and the cover element will be substantially homogeneous in that case, so that the thermal resistance of the insulating layer will be substantially the same across the entire insulating layer. The formation of thermal bridges is prevented. The cover element may for example have the shape of a cup or a cylinder. The shape of the inner cover surface in particular corresponds to the shape of the outer housing surface, for example in that the outer housing surface, like the cover element, is in particular cylindrical in shape, for example. It is furthermore conceivable that the cover element has the shape of a cube or a rectangular box, depending on the shape of the insulating housing.

It is also conceivable that a layer of an insulating or non-insulating material is provided on the inner cover surface, the outer housing surface, or both, or a part thereof for the purpose of adjusting the thermal resistance. Such a layer may consist of a thermally insulating or thermally reflective coating, for example.

In practice such a flow meter usually comprises a U-shaped flow tube, wherein the legs of the U pass through the bores in the base part. The cover element preferably surrounds the entire flow measuring tube. The height of the cover element, measured in a direction substantially parallel to the legs of the U-shaped flow tube, can for that purpose be selected to be larger than the length of each of the legs, and the diameter of the cover element, measured in a direction substantially parallel to the measuring tube, can be selected to be larger than the length of the measuring tube part.

The cover element may be provided on the base part as an integral cover element, but it is also possible to embody the cover element as a number of cover element parts which are joined together to form the cover element. Furthermore, the insulating housing and the base part can each comprise a number of parts. This can simplify the assembly of the flow meter.

The insulating layer preferably comprises air. Air has a relatively high thermal resistance, and providing such a layer of air between the insulating housing and the cover element is relatively easy. The air may be retained in a material having a cell-like structure, for example. The use of gases other than air is also conceivable. In a special embodiment, the insulating layer comprises a vacuum.

In a further embodiment, the insulating layer consists of air. No retaining material is used in that case. Preferably, the air is retained between the insulating housing and the cover element, so that convection of air into and out of the insulating layer is reduced or even eliminated, resulting in an improved thermal insulation. In addition to using air, it is also conceivable to use other gases or insulating materials in the insulating layer.

In a preferred embodiment of the flow meter, the insulating layer has a thermal resistance exceeding 2.5 $m^2$ K/W. It has been found that such a thermal resistance strongly reduces the development of temperature gradients across (part of) the flow tube and/or across the resistance elements.

In another embodiment, the cover element is detachably attached to the base. In this way the cover element can be installed and removed in a quick and simple manner, for example during assembly or maintenance of the flow meter. The cover element may for example be attached to the base part by means of a screw thread, a clamping system, magnets or other similar re-closable means of attachment. On the other hand it is also conceivable that the cover element is fixed to the base part, for example by glueing, welding, in particular laser welding. The insulating housing preferably functions as a thermal coupling with the base part, such that temperature disturbances are dissipated to the base and do not affect the measuring tube part. Furthermore it is possible to provide a temperature sensor on the thermal coupling, for example in that the insulating housing comprises a temperature sensor.

In one embodiment, the flow meter comprises a device housing which surrounds the assembly of the base part with the cover element and the insulating housing. The device housing protects the assembly against undesirable external influences, such that the sensor part and the thermal screen that has been provided by the cover element are protected against damage.

The flow meter may comprise control and/or regulating means connected to the flow measuring tube, which are at least in part provided between the device housing and the cover element. As already indicated, the device housing protects the control and/or regulating means against damage, for example during use, but also during transport.

The invention will now be explained in more detail with reference to a few preferred embodiments shown in the appended figures.

FIG. 1b shows a sectional plan view of the flow meter of FIG. 1a, along the line 1b-1b in FIG. 1a;

FIG. 3 shows a cross-sectional view of the flow meter of FIG. 2a along the line III-III in FIG. 2a;

FIG. 4 is a cross-sectional view of the flow meter of FIG. 2 along the line IV-IV in FIG. 2a.

Figure 1A:
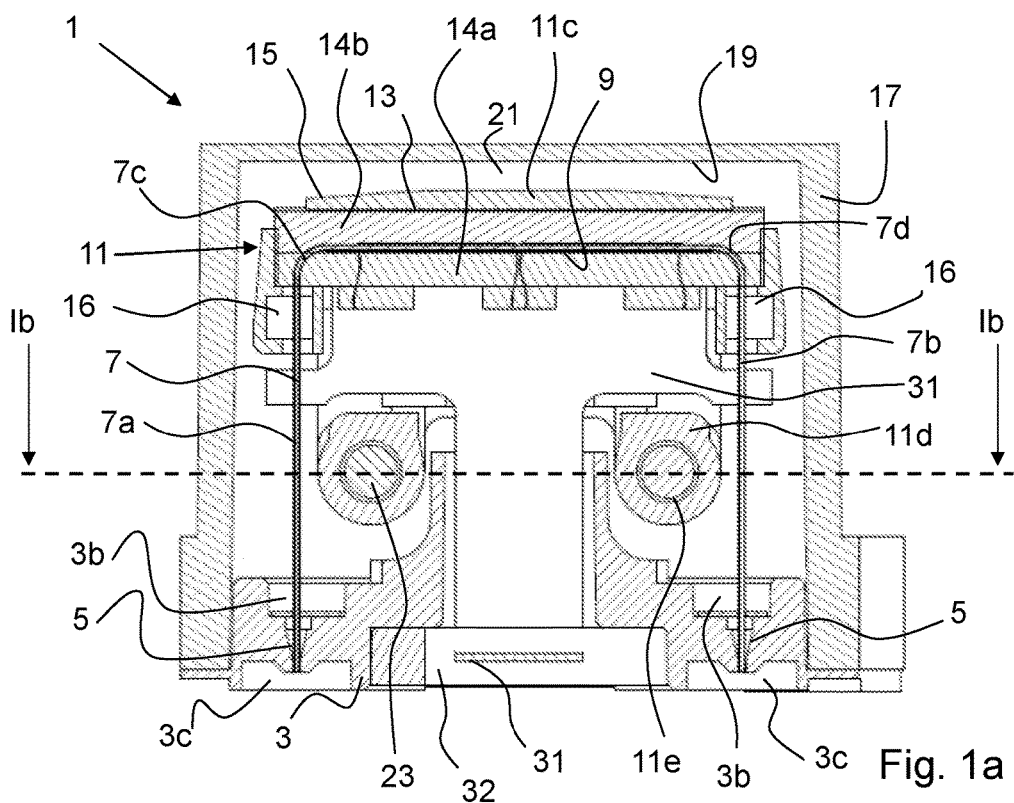
FIG. 1a shows a longitudinal sectional view of a flow meter according to the present invention in a plane defined by the flow tube of the flow meter.

FIG. 1a shows an embodiment of the flow meter 1 according to the present invention. FIG. 1a shows a longitudinal sectional view in a plane defined by the flow tube 7 of the flow meter 1. The flow meter 1 comprises a base part 3. In the base part 3, two parallel bores 5 are provided. The bores 5 extend parallel to the plane of FIG. 1. Through said bores 5, the flow tube 7 extends. In the illustrated embodiment, the flow tube 7 is U-shaped, comprising two legs 7a, 7b which are interconnected by means of a measuring tube part 9 that forms the base of the U. Each leg 7a, 7b of the flow tube 7 extends through one of the bores 5. It is noted that in one embodiment the flow tube is integrally formed, and that the legs 7a, 7b and the measuring tube part 9 are integrally interconnected, therefore. The insulating housing 11 surrounds the measuring tube part 9, with the inner housing surface 13 of the insulating housing 11 facing the measuring tube part 9. A fluid can flow through the flow tube 7, the mass flow rate of which fluid can be determined by means of the resistance elements (not indicated by a numeral), which are in thermally conductive contact with the measuring tube part 9. Such a method of thermally measuring the flow rate has already been explained above and is known per se to the skilled person.

According to the present invention, a cover element 17 is provided. Said cover element 17 is attached to the base part 3. The cover element 17 surrounds the insulating housing 11. An outer housing surface 15 of the insulating housing 11 faces the inner cover surface 19 of the cover element 17. The cover element 17 is disposed spaced from the insulating housing 11, in any case at the location of the measuring tube part 9. An insulating layer 21 is therefore formed between the outer housing surface 15 and the inner cover surface 19. In the illustrated embodiment, a hollow space 21 is formed between the cover element 17 and the insulating housing 11, which hollow space thus forms the insulating layer 21. The hollow space 21 may comprise a gas, for example, such as air. It is conceivable that other gases are used, or that a filling material comprising air (or another insulating gas) is provided.

As FIG. 1a shows, the cover element 17 is shaped to correspond to the U-shape of the flow tube 7. The cover element 17 fits around the base part 3 and is in contact therewith, in particular near the bottom side of the flow meter 1. The cover element 17 joins the base part 3 and is connected thereto, using a suitable technique such as (laser) welding, glueing, screwing, clamping. In one embodiment it is conceivable that the connection of the cover element 17 to the base part 3 is made airtight, so that a fully sealed insulating layer 21 is obtained.

Near the upper side of the flow meter 1, the cover element 17 is disposed spaced from the insulating housing 11. The spacing between the insulating housing 11 and the inner cover surface 19, which is about 0.6-0.8 mm in the illustrated embodiment, is substantially the same over the entire circumference of the insulating housing 11.

As FIG. 1a shows, the insulating housing 11 comprises a first insulating housing part 11c. The inner side of the insulating housing part 11c, i.e. the part of the insulating housing part 11c that faces the measuring tube part 9, forms a receiving space. In said receiving space, the measuring tube part 9 is accommodated. In the illustrated embodiment, the receiving space 11a is filled with a thermally insulating element 14, which, in the illustrated embodiment, consists of two insulating parts 14a, 14b, of which only the insulating part indicated at 14a is shown in FIG. 1a. The insulating element 14 (see also FIG. 4) is in contact with the measuring tube part 9.

The measuring tube part 9, or at least one or more of the sensor elements in the form of resistance elements, is connected to electrical connecting means, in the illustrated embodiment in the form of a PCB (Printed Circuit Board) 31, in particular a flexible PCB 31.

The measuring tube part 9 blends into the legs 7a, 7b of the U-shaped flow tube 7 via bends 7c, 7d. A part of the legs 7a, 7b near the bends 7c, 7d is accommodated in the insulating housing 11, partly within glue chambers 16, which can be filled with glue having a heat conduction of >0.9 W/m K, for mechanically and thermally coupling the tube 7 to the insulating housing 11. Such a construction is known from EP 1 867 962. From the glue chambers 16, and thus from the insulating housing 11, the legs 7a, 7b extend to the base part 3. It is also conceivable for the insulating housing 11 to be larger, extending over the entire width up to the base part 3 and thus accommodating substantially the entire flow tube 7.

To enable easy placement of the flow tube 7 in the insulating housing 11, the insulating housing 11 comprises two insulating housing parts 11c, 11d. Both insulating housing parts 11c, 11d comprise recesses that form cavities when the insulating housing parts 11c, 11d abut against each other, thus forming the glue chambers 16 and the aforesaid receiving space. Through bores lie are provided in the insulating housing parts 11c, 11d, spaced from the receiving space, such that the insulating housing parts can be interconnected by means of fasteners 23. A fastener 23 may be a pin, a bolt or a screw that extends through the openings lie, thus aligning the insulating housing part 11c, 11d with respect to each other.

FIG. 11b is a sectional plan view of the flow meter 1 at the location of the fasteners 23. As shown here, the outer side of the flow meter is formed by the cover element 17, and at least part of the base part 3 is provided on the inner side. The lower parts of the insulating housing part 11c, 11d are disposed one on top of the other, and the insulating housing 11 formed by the insulating housing parts 11c, 11d is placed on a guide 3a of the base part 3 with the openings lie in alignment with each other. In the guide 3a and the openings lie of the insulating housing lithe fastener 23 is provided, so that the insulating housing ills placed on the base part 3 in a simple manner. In one embodiment, the fastener 23 is a thermally conductive screw connection between the base 3 and the insulating housing 11.

In one embodiment, the insulating housing 11 is formed of a conductive material, in particular Zamak 5.

Referring again to FIG. 1a, the legs 7a, 7b of the flow tube 7 are shown to extend from the insulating housing 11 and through the base part 3, with the flow tube 7 entering the base part 3 on one side via base part chambers 3b, which are filled with an epoxy, by means of which the space inside the cover element and the base part 3 can be hermetically sealed. In this way a constant gas composition in the insulating layer is obtained. The flow tube 7 subsequently extends through the bores 5 and terminates in the sealing recesses 3c. At an end of each bore 5, the flow tube 7 is connected to the base part 3, for example by welding, in particular laser welding. It is conceivable that the flow tube 7 continues to beyond the sealing recesses 3c. Sealing means 25 (see FIG. 2a), such as gaskets of plastic material, in particular viton gaskets, or preferably O-rings, are provided in the sealing recesses 3c.

Figure 1B:
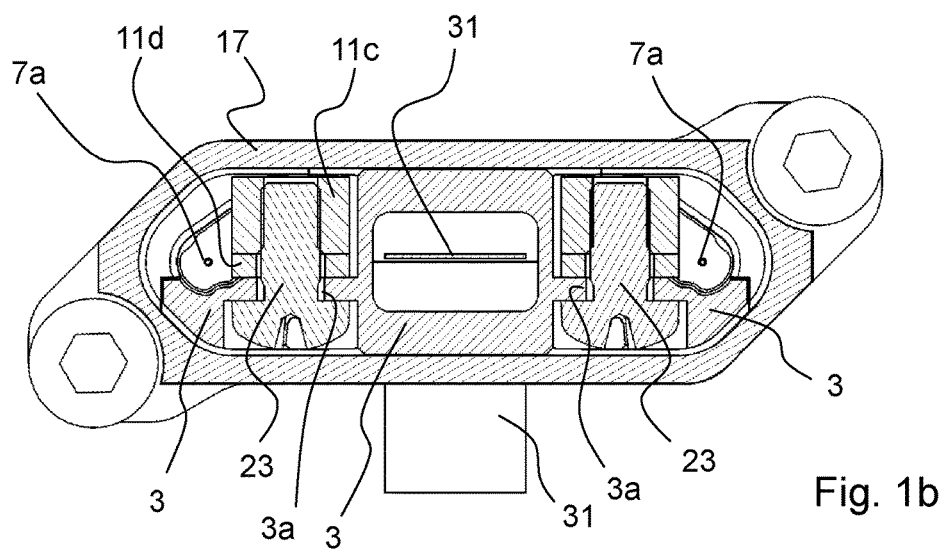
Figure 2A:
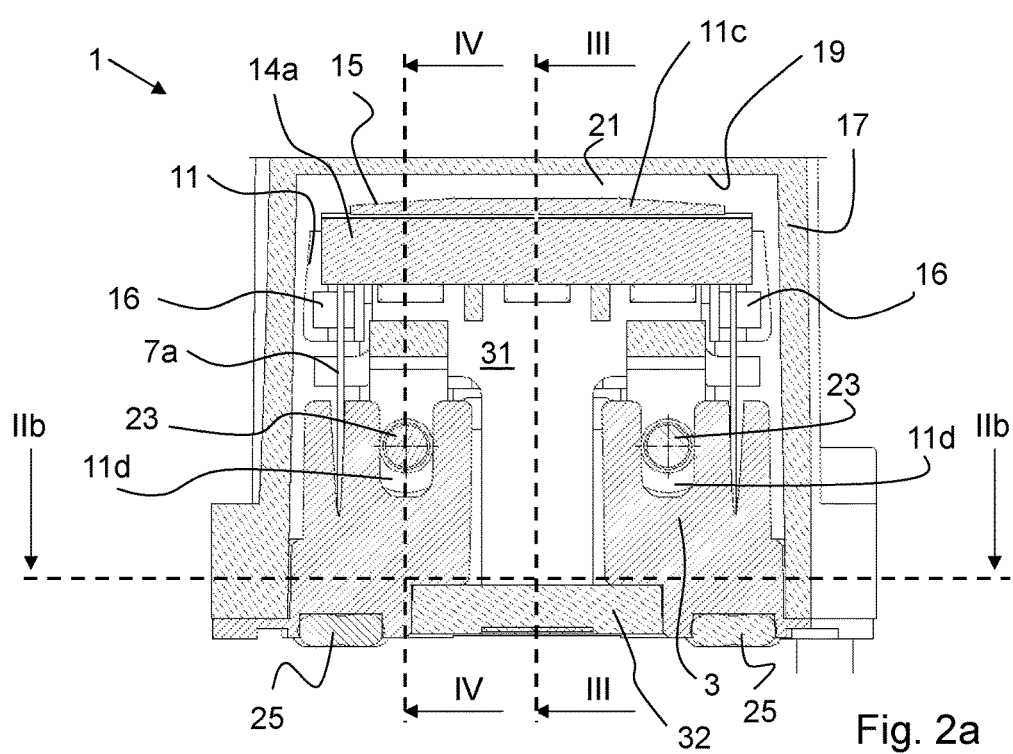
FIG. 2a shows a longitudinal sectional view of the flow meter of FIGS. 1a and 1b along the line IIa-IIa in FIG. 2b.
Figure 2B:
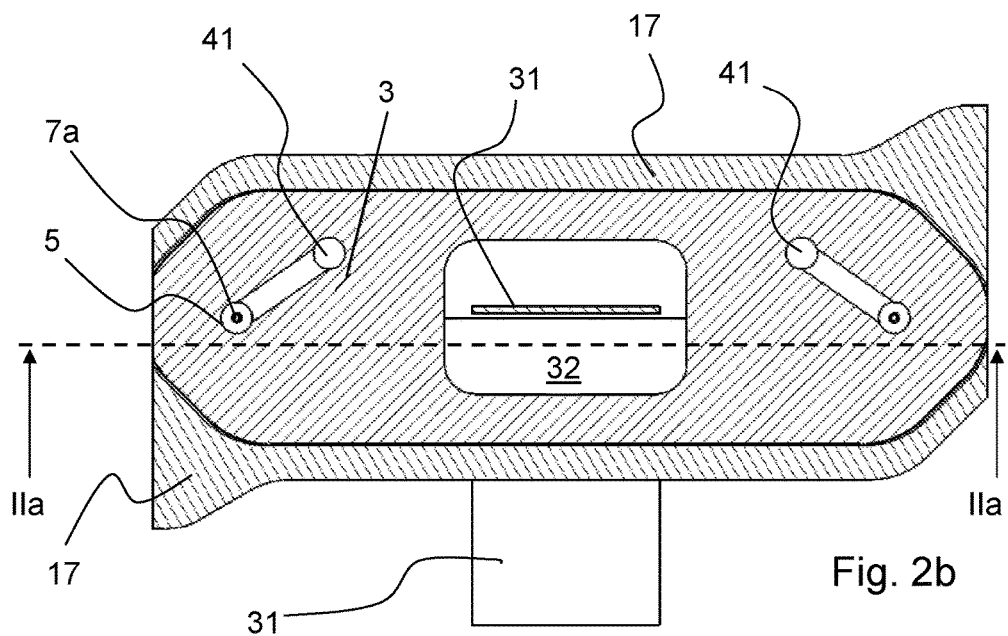
FIG. 2b shows a sectional plan view of the flow meter of FIG. 2a along the line IIb-IIb in FIG. 2b.

FIG. 2a shows a longitudinal sectional view of a flow meter 1 in a plane parallel to the plane of the section in FIG. 1, in particular along the line IIa-IIa in FIG. 2b. FIG. 2a clearly shows in particular the sealing means 25, for example O-rings, which are provided in the sealing recesses (3c, see FIG. 1a) in the base part 3.

FIG. 2b shows a sectional plan view of the flow meter 1 of FIG. 2a, taken along the line IIb-IIb. In particular the connection between the cover element 17 and the base part 3 is shown here. As shown, the base part is provided with the bores 5, through which the tube parts 7a, 7b of the flow tube 7 extend. So-called leak test holes 41 are provided at locations spaced from the bores 5. Said leak test holes are connected to the bores 5 by means of a channel that extends between the bores 5 and the associated leak test hole 41. Using the leak test holes 41 it is possible to check whether the connection of the flow tube 7 to the base part 3, a welded connection in one embodiment, has been properly made. Said hole 41 furthermore ensures that in case of a failure of the connection between the flow tube 7 and the base part 3, for example due to corrosion, gas cannot accumulate between the cover element 17 and the base part 3.

FIG. 3 is a cross-sectional view of the flow meter 1 of FIG. 2a, taken along the line III-III. The flow meter 1 comprises the base part 3, over which the cover element 17 is placed. Centrally provided in the base 3, on a bottom side thereof, is a cavity, in which cavity a stop element 32 is present. Above the stop element 32 an epoxy chamber 33 is provided. The epoxy chamber functions to hermetically seal the space within the cover element 17 and the base part 3. The stop element prevents epoxy from flowing out of the interior of the flow meter 1 while the sensor is being formed. The electronic connecting means in the form of the PCB 31 extend through the epoxy chamber 33 and the stop element 32. The skilled person will appreciate that the connecting means may also be configured differently, for example in the form of optical connecting means.

FIG. 3 further shows that an internal part of the insulating housing formed by the first insulating housing part 11c and the second insulating housing part 11d is filled by two insulating parts 14a, 14b at the location of the measuring tube part 9. The measuring tube part 9 is centrally positioned in the insulating parts 14a, 14b. The figure clearly shows that the cover element 17 is spaced from the insulating housing 11.

FIG. 4, to conclude, is a cross-sectional view of a flow meter 1 through one of the fasteners 23, taken along the line IV-IV in FIG. 2a. The fastener 23, in this case in the form of a screw, extends through the guide 3a of the base part 3 and through the openings 11e of the two insulating housing part 11c, 11d. This figure, too, shows that the interior of the insulating housing 11, which is made up of the two insulating housing parts 11c, 11d, is filled by insulating parts 14a, 14b. Said insulating parts may for example be made of a material having an open cell structure, such as polyurethane foam, for example.

The skilled person will appreciate that in the foregoing the invention has been described with reference to a few preferred embodiments. The invention is not limited to these embodiments, however. Many modifications are conceivable within the scope of the invention. The scope of the protection is determined by the appended claims.

The invention claimed is:

1. A flow meter comprising:
a base part provided with at least two through bores extending substantially parallel to each other;
a flow tube for a medium whose flow is thermally determined, which flow tube extends through the at least two through bores, wherein a part of the flow tube spaced from the base part comprises a measuring tube part where the flow of the medium can be measured;
an insulating housing connected to the base part, which surrounds at least the measuring tube part of the flow tube, the insulating housing comprising an inner housing surface, which faces the measuring tube part, as well as an outer housing surface, which faces away from the measuring tube part;
characterised in that the flow meter comprises a cover element connected to the base part, which cover element at least substantially surrounds the insulating housing, wherein the cover element comprises an inner cover surface which faces the outer housing surface and which is spaced therefrom by a distance such that an insulating layer is formed between the inner cover surface and the outer housing surface, wherein the spacing between the inner cover surface and the outer housing surface is substantially constant and, wherein a shape of the inner cover surface substantially corresponds to a shape of the outer housing surface.

2. The flow meter according to claim 1, wherein the insulating layer comprises a gas.

3. The flow meter according to claim 2, wherein the insulating layer consists of air.

4. The flow meter according to claim 1, wherein the insulating layer comprises a vacuum.

5. The flow meter according to claim 1, wherein the insulating layer has a thermal resistance that exceeds 2.5 m$^2$ K/W.

6. The flow meter according to claim 1, wherein the cover element is detachably connected to the base part.

* * * * *